US012602024B2

(12) United States Patent
Nistler

(10) Patent No.: US 12,602,024 B2
(45) Date of Patent: Apr. 14, 2026

(54) PRODUCT IDENTIFICATION BASED ON GEOLOCATION

(71) Applicant: CNH Industrial America LLC, New Holland, PA (US)

(72) Inventor: Jonathan Richard Nistler, Moorhead, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 568 days.

(21) Appl. No.: 18/087,229

(22) Filed: Dec. 22, 2022

(65) Prior Publication Data

US 2024/0210909 A1     Jun. 27, 2024

(51) Int. Cl.
| | |
|---|---|
| G05B 19/00 | (2006.01) |
| G05B 19/19 | (2006.01) |
| G06V 10/44 | (2022.01) |
| G06V 20/56 | (2022.01) |
| G06Q 10/087 | (2023.01) |

(52) U.S. Cl.
CPC ............. G05B 19/19 (2013.01); G06V 10/44 (2022.01); G06V 20/56 (2022.01); *G06Q 10/087* (2013.01); *G06V 2201/06* (2022.01)

(58) Field of Classification Search
None
See application file for complete search history.

(56) References Cited

U.S. PATENT DOCUMENTS

| | | | |
|---|---|---|---|
| 5,850,341 A * | 12/1998 | Fournier | E02F 9/2045 |
| | | | 701/34.2 |
| 10,853,748 B2 | 12/2020 | Ha et al. | |
| 10,891,566 B2 | 1/2021 | Ha et al. | |
| 2016/0299116 A1 * | 10/2016 | Talmaki | G01S 5/02 |
| 2017/0285655 A1 * | 10/2017 | Katou | G09B 29/007 |
| 2021/0182753 A1 | 6/2021 | Shatters et al. | |
| 2021/0182758 A1 | 6/2021 | Deenathayalan et al. | |
| 2021/0318666 A1 | 10/2021 | Brockhurst | |

* cited by examiner

*Primary Examiner* — Paul B Yanchus, III
(74) *Attorney, Agent, or Firm* — Fletcher Yoder, P.C.

(57) ABSTRACT

A product identification system includes a controller configured to identify a loading action performed by a work vehicle and determine whether the work vehicle is located within a threshold distance of a geofence. In response to determining that the work vehicle is located within a threshold distance of the geofence, the controller determines a determined product type associated with the loading action based on a model which associates the geofence with the determined product type. In response to determining that the work vehicle is not located within the threshold distance of the geofence, the controller determines a current product type associated with the loading action. The controller determines whether the current product type matches the determined product type associated with the geofence. In response to determining that the current product type matches the determined product type, the controller updates the geofence to include a location of the work vehicle.

15 Claims, 4 Drawing Sheets

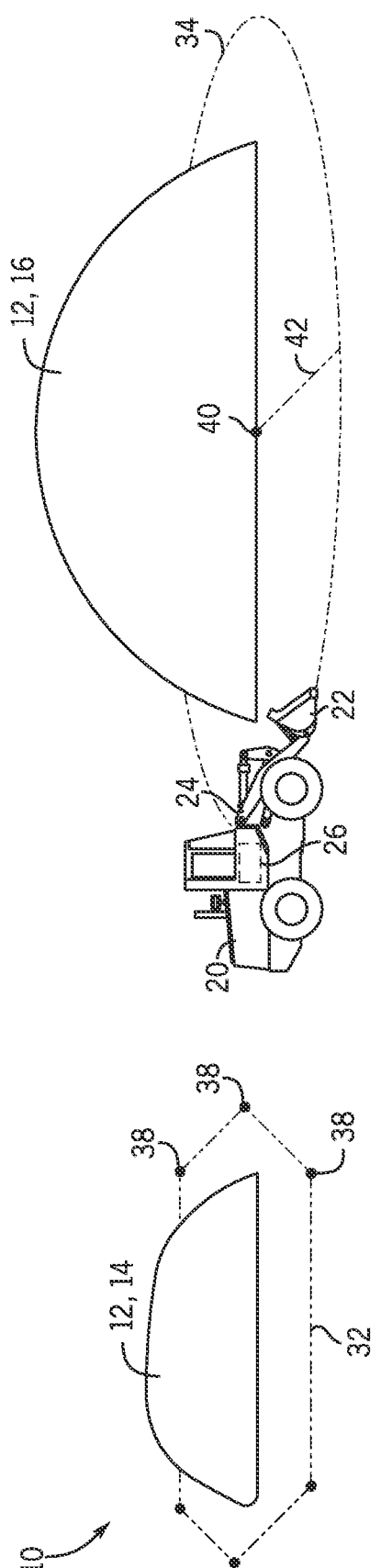
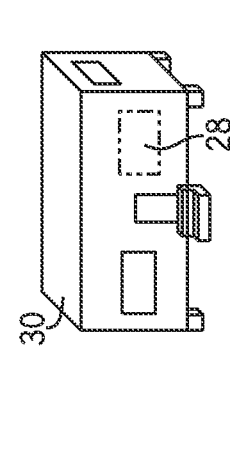
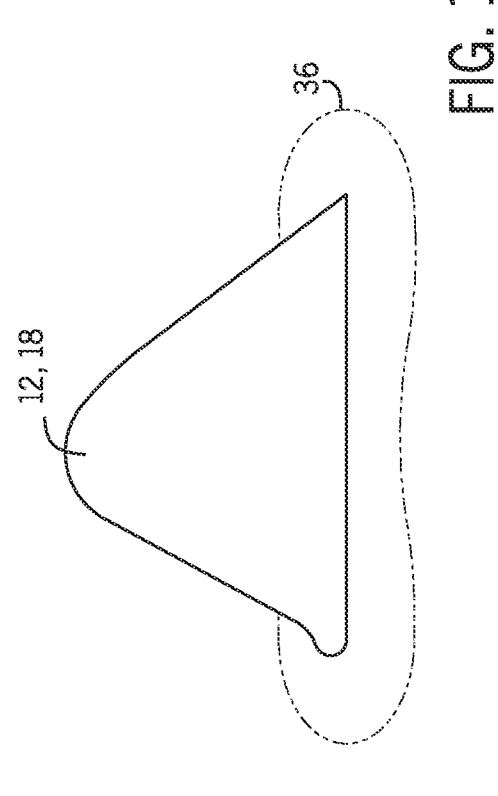
FIG. 1

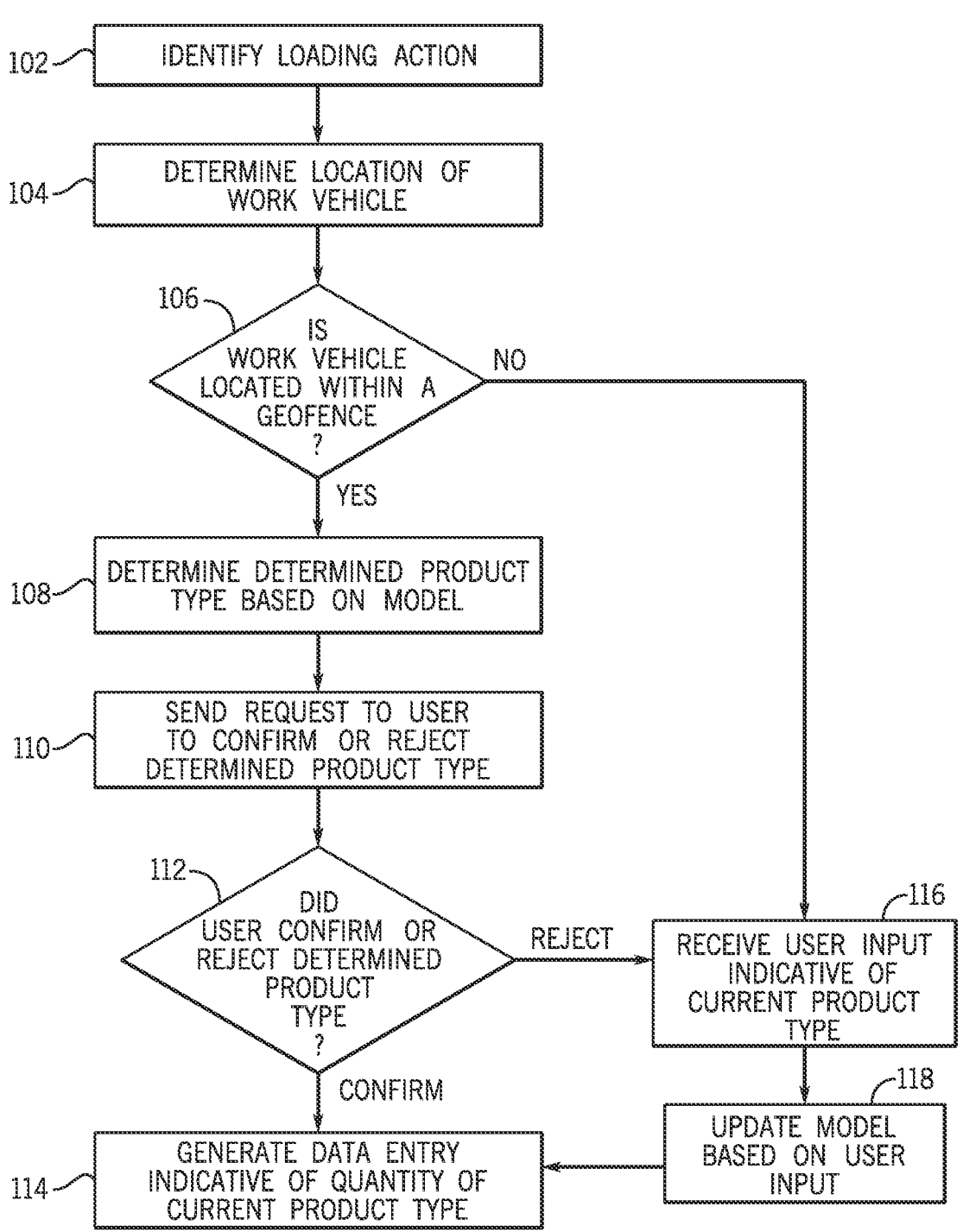

102 — IDENTIFY LOADING ACTION

104 — DETERMINE LOCATION OF WORK VEHICLE

106 — IS WORK VEHICLE LOCATED WITHIN A GEOFENCE ?

NO

YES

108 — DETERMINE DETERMINED PRODUCT TYPE BASED ON MODEL

110 — SEND REQUEST TO USER TO CONFIRM OR REJECT DETERMINED PRODUCT TYPE

112 — DID USER CONFIRM OR REJECT DETERMINED PRODUCT TYPE ?

REJECT

CONFIRM

116 — RECEIVE USER INPUT INDICATIVE OF CURRENT PRODUCT TYPE

118 — UPDATE MODEL BASED ON USER INPUT

114 — GENERATE DATA ENTRY INDICATIVE OF QUANTITY OF CURRENT PRODUCT TYPE

FIG. 3

PRODUCT IDENTIFICATION BASED ON GEOLOCATION

BACKGROUND OF THE INVENTION

The present disclosure relates generally to product identification based on geolocation.

This section is intended to introduce the reader to various aspects of art that may be related to various aspects of the present disclosure, and are described below. This discussion is believed to be helpful in providing the reader with background information to facilitate a better understanding of the various aspects of the present disclosure. Accordingly, it should be noted that these statements are to be read in this light, and not as admissions of prior art.

An industrial job site may include piles of various products, such as dirt, gravel, sand, and other earthen materials. A work vehicle, such as a wheel loader, may interact with the piles in various ways. For example, the work vehicle may extract and carry a load of product from a pile to a different location, such as another machine (e.g., a dump truck), another pile, or another job site. A billing or inventory management system may rely on an operator of the work vehicle to manually track a product type for each load. Such reliance on the operator may be time-consuming and errable.

SUMMARY OF THE INVENTION

In certain embodiments, a product identification system includes a controller having one or more processors and a memory. The controller is configured to identify a loading action performed by a work vehicle and determine whether the work vehicle is located within a threshold distance of a geofence. In response to determining that the work vehicle is located within a threshold distance of the geofence, the controller determines a determined product type associated with the loading action based on a model. The model associates the geofence with the determined product type. In response to determining that the work vehicle is not located within the threshold distance of the geofence, the controller determines a current product type associated with the loading action. The controller further determines whether the current product type matches the determined product type associated with the geofence in the model. In response to determining that the current product type matches the determined product type, the controller updates the geofence to include a location of the work vehicle.

In certain embodiments, a controller having one or more processors is configured to identify a loading action or a material load performed by a work vehicle. The controller is also configured to determine a location of the work vehicle and, in response to determining that the work vehicle is located within a geofence, determine a determined product type associated with the material load based on a model in which the determined product type corresponds to the geofence. Additionally, the controller receives, via a user interface, a first user input confirming or rejecting the determined product type. In response to receiving the first user input rejecting the determined product type, the controller is configured to receive a second user input indicative of a current product type. Further, the controller generates a corrected geofence which includes the location of the work vehicle. Additionally, the controller updates the model to associate the corrected geofence with the current product type.

In certain embodiments, a product identification system includes a controller having one or more processors and a memory. The controller is configured to determine position data of a work vehicle and receive image data of surroundings of the work vehicle. Additionally, the controller is configured to identify one or more piles of material in the image data and determine one or more object boundaries of the one or more piles. The controller is further configured to compare the one or more object boundaries with one or more geofences stored in a database and update the one or more geofences based on the one or more object boundaries.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a diagram of an embodiment of an industrial job site in accordance with an aspect of the present disclosure.

FIG. 3 is a flowchart of an embodiment of a method for determining a determined product type based on a model and adjusting the model based on operator feedback in accordance with an aspect of the present disclosure.

DETAILED DESCRIPTION

Figure 2:
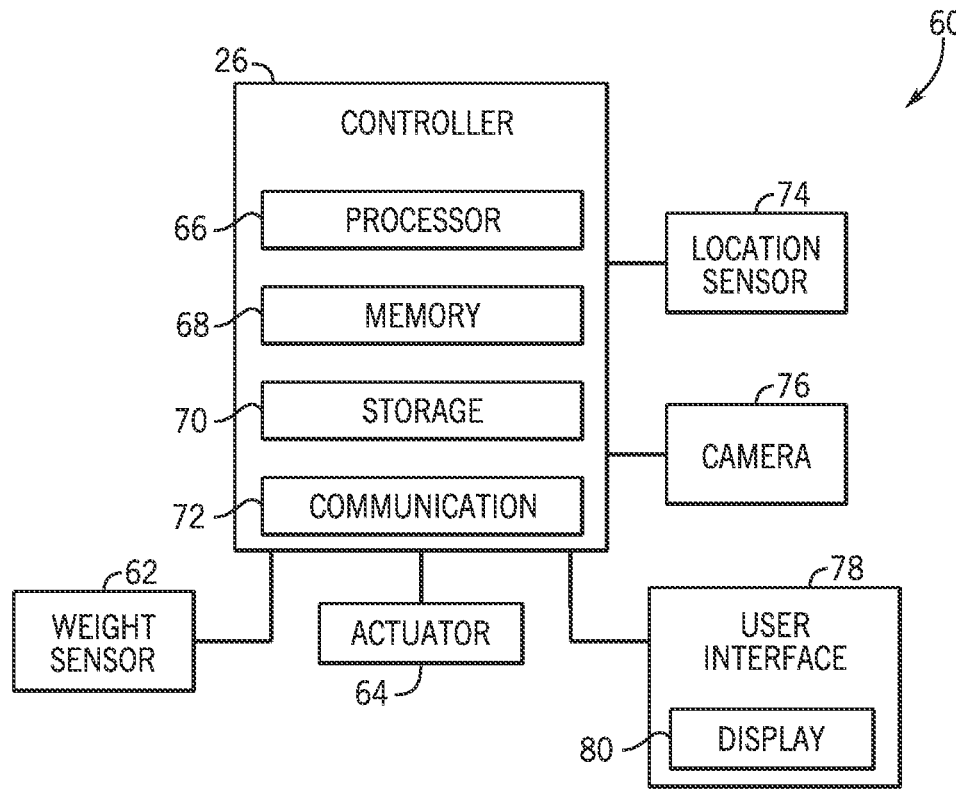
FIG. 2 is a schematic diagram of an embodiment of a control system of a work vehicle in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed toward identifying a product type based on a location of a work vehicle. As discussed above, a work vehicle may be employed at an industrial job site to load and/or transport a product material. A variety of product materials (e.g., dirt, gravel, rock, lumber) may be located in different areas of the industrial job site. For example, product materials may be located in piles at different locations, and each pile corresponds to a product type (e.g., crushed stone, slate rock, mulch). A billing or inventory management system may track an amount (e.g., mass, volume) and product type corresponding to each load handled by the work vehicle. In existing systems, an operator may manually submit the product type associated with the load via an operator device. However, relying on manual operator inputs to identify the product type may be slow and error-prone (e.g., the operator may select an incorrect product type or forget to select the product type). As such, in some embodiments of the present disclosure, a controller of the work vehicle may determine a determined product type based on the location of the work vehicle and recommend selection of the determined product type to the operator. In other embodiments, the controller may automatically submit the determined product type to the management system.

In some embodiments, areas of the industrial job site may be partitioned or zoned according to product types associated with one or more piles of material in each of the areas. The industrial job site may be represented as a model (e.g., a map, a block model, a database, a data structure, and the like) including one or more geofences representing the areas containing different product types. By way of example, a first geofence may define a first area of the industrial job site containing a pile of a first material (e.g., gravel), a second geofence may define a second area containing a pile of a second material (e.g., mulch), and so on. A controller of the work vehicle may receive or determine the location or position of the work vehicle with respect to the one or more geofences to determine whether the work vehicle is within a geofence or within a threshold distance from a geofence. As the work vehicle manipulates a load or performs a loading action (e.g., lifts a bucket), the controller may determine a determined product type of the load based on the model and the position of the work vehicle. In some embodiments, the controller may determine that the work vehicle is located within a particular geofence, and the controller may further determine that the determined product type is the product type with which the particular geofence is associated in the model. For example, the work vehicle may pick up a load from a particular location, in which the particular location is within a particular geofence of a set of geofences, and the particular geofence is associated with a particular material (e.g., gravel) in the model. Then, the controller may determine that the determined product type of the load is the particular material.

As described in further detail below, the model may be updated based on feedback and/or corrections to the determined product type (e.g., provided by an operator). For example, in response to initiation of a loading operation, the controller may present the determined product type to the operator via a user interface. If the determined product type is inaccurate, the operator may reject the determined product type and provide a current product type. In addition, the location of the work vehicle may not be within a threshold distance of any stored geofence. In response to the initiation of the loading operation, the controller may prompt the operator to provide the current product type because the determined product type cannot be determined based on the model. In response to the operator providing the current product type, the controller may update the model in accordance with the feedback provided by the operator and the location of the work vehicle. For example, the controller may adjust (e.g., redraw) one or more of the geofences, re-map one or more of the geofences and/or generate a new geofence associated with the current product type. In this way, accuracy of the model may be improved. Moreover, the model may be updated as the landscape of the industrial job site changes over time (e.g., as the piles of products change in shape and size).

In another aspect of the present disclosure, the model may be generated, verified, updated, or a combination thereof, based on image data of surroundings of the work vehicle. For example, the controller may receive the image data from a camera on the work vehicle and identify one or more piles of product in the image data. The controller may process the image data to determine object boundaries (e.g., semantic boundaries) of the one or more piles of product in the image data. Based on the object boundaries in the image data, as well as position data of the work vehicle, the controller may determine whether the shape, size, and location of each of the piles as the pile appears in the image data is consistent with the shape, size, and location of each of the piles as the pile is represented by the respective geofence in the model. If the appearance of a pile in the image data is not consistent with the pile as represented in the model, the model may be updated such that the respective geofence corresponds more accurately to the image data. In some embodiments, the controller may process the image data to determine the product type(s) of the one or more piles. The model may be verified or updated according to the determination of the product type(s) by image processing.

Turning now to the drawings, FIG. 1 is a diagram of an embodiment of an industrial job site 10. The industrial job site 10 may be a construction job site, a mining worksite, a landfill, or the like. The industrial job site 10 may include piles 12 containing a variety of products or materials. For example, a first pile 14 may be a pile of gravel, a second pile 16 may be a pile of dirt, and a third pile 18 may be a pile of mulch. A work vehicle 20 (e.g., wheel loader, dump truck, backhoe, bulldozer, material handler, excavator, earth-moving machine, and the like) may operate within the industrial job site 10 to transport loads of product to and from the piles 12. The work vehicle 20 may include a bucket 22 attached to a lift arm 24, which enables the work vehicle 20 to gather and lift a load of material from any of the piles 12. Additionally, the work vehicle 20 may be configured to weigh the load of material by using a weight sensor or by measuring a load on the lift arm 24 (e.g., by measuring hydraulic fluid pressure at the lift arm actuator(s)). Actuating mechanisms (e.g., for the bucket 20, for the lift arm 24, etc.) of the work vehicle 20 may be controlled via a controller 26 of the work vehicle 20. As discussed in greater detail below, the controller 26 may also receive and store data (e.g., from sensing mechanisms, etc.), interface with an operator, and communicate with other devices.

The industrial job site 10 may further include a supervisory control system 28 located at a supervisory control station 30. The supervisory control system 28 may include hardware and software components for monitoring, controlling, and communicating with the work vehicle 20 and other machines in the industrial job site (e.g., additional work vehicles). The supervisory control system 28 may include one or more processors, memory devices, servers, communication components, or a combination thereof, configured to perform computer-executable instructions for controlling and monitoring activity in the industrial job site 10. In some embodiments, the supervisory control system 28 and/or the supervisory control station 30 may be located at a remote location outside the industrial job site 10. Furthermore, in certain embodiments, the supervisory control system and the supervisory control station may be omitted.

The piles 20 may be arranged in a particular layout within the industrial job site 10. For example, each of the piles 20 may contain a designated product or material and occupy a designated area in a designated location of the industrial job site 10. The controller 26 and/or the supervisory control system 28 may generate, store, and maintain a model (e.g., a map, a database, a block model) of the industrial job site 10 indicative of the layout. For example, the model may associate the piles 12 with product types (e.g., gravel, dirt, mulch) and geofences (e.g., a first geofence 32, a second geofence 34, and a third geofence 36). The geofences are virtual perimeters for designated areas of the piles 12. In some embodiments, the geofences may be digitally drawn over an aerial or satellite image of the industrial job site 10. The geofences may also be determined by applying computer vision (e.g., edge detection, boundary detection) to the aerial image to determine boundaries of the piles 12. Furthermore, in certain embodiments, at least one geofence may be formed based at least in part on user-selected parameters, such as boundary coordinates.

By way of example, the first geofence 32 of the first pile 14 may include a set of location coordinates (e.g., GPS coordinates) representing points 38 along a polygonal perimeter around the first pile 14. The model may associate the first geofence 32 with the product type of the first pile 14 (e.g., gravel). In another instance, the second geofence 34 of the second pile 16 may include a location coordinate representing a center point 40 of the second pile 16 and a radius 42 that defines a circle around the second pile 16. All geofences may be defined by boundary points (e.g., the first geofence 32), by a center point and radius (e.g., the second geofence 34), by another system (e.g., spline equations), or by a mixture thereof. The model may associate the second geofence 34 with the product type of the second pile 16 (e.g., dirt). In addition to the first and second geofences, the model may include any number of geofences (e.g., 2, 3, 5, 10). In this way, the model may map each of the piles 12 as a respective geofence having a respective product type. Then, the controller 26 or the supervisory control system 28 may determine, based on the model, that a load acquired by the work vehicle 20 within a particular geofence includes the product type associated with that particular geofence. Components of the controller 26 which enable this determination are described below in reference to FIG. 2.

FIG. 2 is a schematic diagram of an embodiment of a control system 60 for the work vehicle of FIG. 1. The control system 60 includes the controller 26 of the work vehicle. As discussed above, the controller 26 may control actuation of various components and systems of the work vehicle 26. In certain embodiments, the controller may receive weight data from a weight sensor 62, control an actuator 64, communicate with the supervisory control system, and the like. The controller 26 may include a processor 66, a memory 68, a storage 70, and a communication component 72. The processor 66 may be used to execute software, such as software for controlling the actuator 64, analyzing location data, and referencing the model. Moreover, the processor 66 may include multiple microprocessors, one or more "general-purpose" microprocessors, one or more special-purpose microprocessors, and/or one or more application specific integrated circuits (ASICS), or some combination thereof. For example, the processor 66 may include one or more reduced instruction set (RISC) processors.

The memory 68 and the storage 70 may be any suitable articles of manufacture that can serve as media to store processor executable code, data, or the like. These articles of manufacture may represent computer-readable media (e.g., any suitable form of memory or storage) that may store the processor-executable code used by the processor 66 to perform the presently disclosed techniques. For example, the storage 70 may store the model (e.g., as a data structure). The memory 68 and the storage 70 may represent non-transitory computer-readable media (e.g., any suitable form of memory or storage) that may store the processor-executable code used by the processor 66 to perform various techniques described herein. Non-transitory merely indicates that the media is tangible and not a signal. The communication component 72 may be a wireless or wired communication component that may facilitate communication between various components of the control system 60 and the supervisory control system.

The controller 26 is communicatively coupled to the weight sensor 62. The weight sensor 62 may be a load cell in the bucket, a hydraulic pressure sensor for the lift arm actuator(s), or any suitable sensor for determining a load weight carried by the work vehicle. The load weight may be used in conjunction with the product type for managing billing and inventory. For example, when the work vehicle acquires a load of a particular load weight and a particular product type, the controller 26 may generate a data entry indicative of the same. A set of data entries may be generated and stored as a record of product quantities and types transported by the work vehicle. The set of data entries may be used to bill a customer and/or track inventory. Additionally, the load weight and a density of the product may be used to determine a load volume. For example, the controller 26 may determine (e.g., lookup) a product density associated with the product type. In addition, the controller 26 may determine a fill metric based on the load weight and the product density. The fill metric may be used to determine loading performance. For example, the controller 26 may determine a maximum load weight based on the product density and the volume capacity of the bucket. The fill metric may be determined based on a ratio of the load weight to the maximum load weight. If the bucket is fully loaded (i.e., filled to the volume capacity), the fill metric may indicate efficient loading and transport of the product. As such, the operator may seek to enhance the fill metric as a loading performance indicator.

The control system 60 further includes a position sensor 74 located on the work vehicle. The position sensor 74 may provide the controller 26 sufficient information to determine a location of the work vehicle using GPS, signal trilateration, cell tower triangulation, or any suitable method of locating the work vehicle absolutely or relative to the geofences. The controller 26 may determine the location of the work vehicle to detect when the work vehicle is located within a geofence or within a threshold distance from a geofence. In some embodiments, the controller 26 may associate the work vehicle with a geofenced area and the respective product type in response to determining the work vehicle is within a threshold proximity (i.e., close enough) to the geofence. In some embodiments, the position sensor 74 may also sense an orientation of the work vehicle, such as a facing direction. The location of the work vehicle, in combination with the orientation, may be considered position data of the work vehicle.

In the illustrated embodiment, the control system 60 includes a camera 76, and the controller 26 is communicatively coupled to the camera 76. The camera 76 is configured to capture image data of surroundings of the work vehicle. The image data may include photographs captured at certain time intervals or in response to an event (e.g., a command or a sensor signal), and/or the image data may include a video feed. Using the camera 76 and the image data produced therefrom, the controller 26 may identify one or more of the piles within view of the camera 76. Based on the image data and the position data of the work vehicle, the controller 26 may determine the location, shape, size, product type, or a combination thereof, of a pile. As discussed in detail below with reference to FIG. 4, the image data may be compared to the model to verify the model or update the model based on the image data (e.g., changes to the piles). While the control system 60 includes a camera 76 in the illustrated embodiment, in other embodiments, the camera may be omitted.

In some embodiments, the control system 60 includes a user interface 78. The user interface 78 may display, via a display 80, information related to the work vehicle and/or the industrial job site. For example, the display 80 may present operating parameters (e.g., speed, fuel, health, etc.) and system information (e.g., firmware version, vehicle type, operating instructions, etc.) of the work vehicle. In some embodiments, the display 80 may display an indication indicative of a determined product type, in which the indication is generated by the controller 26 based on the model and the position of the work vehicle. Furthermore, the user interface 78 may receive user inputs from the operator via buttons, a keyboard, a touchscreen, and the like. For example, the display 80 may present a determined product type, whereupon the operator may confirm or reject the determined product type, submit the current product type, request to view information pertaining to the model, or a combination thereof.

In some embodiments, at least some processing and command functions of the controller 26 may be performed remotely by the supervisory control system. For example, the model may be stored and maintained by the supervisory control system. The controller 26 may output the location data, telemetry data, and the user inputs to the supervisory control system. In response, the supervisory control system may determine the determined product type, modify the model, and output indications to the user interface.

Although the components described above have been discussed with regard to the controller 26, similar components may make up other computing devices described herein, such as the supervisory control system. Further, the listed components are provided as example components and the embodiments described herein are not to be limited to the components described with reference to FIG. 2.

Keeping the foregoing in mind, the sizes, shapes, locations, and product types of the piles may change over time. For example, a pile may shrink over time as material is removed from the pile, rendering the model outdated. As such, the presently disclosed techniques provide a method to verify and/or modify the model based on feedback (e.g., from the operator, from the camera). In some embodiments, the controller may determine the determined product type and subsequently output an indication to the user interface 78. The indication may include the determined product type and a request for the operator to confirm or reject the determined product type. After the operator confirms the determined product type, the controller may output the determined product type to the management system, and the management system may generate a data entry including a quantity (e.g., a weight, a volume) of the product. On the other hand, if the operator rejects the determined product type, then the controller may receive, via the user interface, a user input indicative of a current product type (e.g., the product type identified by the operator). The controller 26 may adjust the model to reflect that the current product type corresponds to the location of the work vehicle (e.g., the product of the current product type is positioned at the location of the work vehicle). For example, the controller may adjust one or more of the geofences, such that a geofence associated with the rejected determined product type is updated to exclude the location of the work vehicle, and another geofence associated with the current product type is updated to include the location of the work vehicle. In some cases, the work vehicle may acquire a load at a location substantially remote from the geofence associated with the current product type, or the current product type may not be present within the model of the industrial job site. In such cases, the controller may adjust the model to include a geofence associated with the current product type at the location of the work vehicle.

Referring now to FIG. 3, FIG. 3 is a flowchart of an embodiment of a method 100 for determining the determined product type based on the model and adjusting the model based on operator feedback. Although the method 100 is described below as performed by the controller, the method 100 or portions thereof may be performed by any suitable computing device and/or processor, such as the supervisory control system. Moreover, although the following description of the method 100 includes steps performed in a particular order, the steps of the method 100 may be performed in any suitable order.

At block 102 of the method 100, the controller may identify a loading action performed by the work vehicle. For example, the controller may identify the loading action by determining that the work vehicle has performed, is performing, or is expected to perform a loading action. The loading action may include any action taken by the work vehicle to obtain a load of product from a pile. For example, the controller may receive a command from the operator or the supervisory control system to perform the loading action. In another example, the controller may detect a change in weight in the bucket indicative of a load. In any case, the controller may determine the determined product type in response to identifying that the work vehicle is performing the loading action. In this way, each load may be associated with a respective loading action, and the method 100 may be triggered in response to loading.

At block 104, the controller may determine the location (e.g., geospatial coordinates) of the work vehicle using the position sensor. As discussed above, the controller may use GPS or any suitable positioning system to determine the location of the work vehicle. The controller may also determine the orientation (e.g., facing direction) of the work vehicle. In some embodiments, block 104 may precede block 102, such that the controller cyclically/iteratively monitors the location of the work vehicle even while no loading action is performed.

At block 106, the controller may determine whether the location of the work vehicle is within a geofence or within a threshold distance from the geofence. For example, the controller may reference the model to retrieve a set of geofences and determine whether any of the geofences encompasses the location of the work vehicle. By way of example, the work vehicle may be located at a location (x, y) within the bounds of a particular geofence or within (e.g., less than or equal to) a threshold distance from a particular geofence, whereupon the controller may proceed to block 108. Alternatively, the location (x, y) may be greater than the threshold distance from any of the geofences, whereupon the controller may proceed to block 116. If the controller determines that the work vehicle is located within or within a threshold distance of any of the geofences, then the controller may proceed to block 108. In some embodiments, the facing direction of the work vehicle may be used to determine whether the work vehicle is considered to be within the geofence. For example, a work vehicle located just outside the geofence and facing toward the geofence may be considered to be associated with the geofence (e.g., nominally within the geofence).

At block 108, the controller may reference the model to determine a determined product type based on the location of the work vehicle relative to the geofences. For example, the controller may determine which geofence corresponds to the location of the work vehicle (e.g., the geofence in which the work vehicle is located, the geofence that is within the threshold distance from the work vehicle). Then, the controller may look up or otherwise determine the product type associated with the geofence in the model. For example, the model may be a database containing sets of parameters (e.g., discrete boundary coordinates, vector shape parameters, a center point location and a diameter/radius, spline equation parameters, and the like), each set representing a geofence. Additionally, each geofence may be associated with a respective product type in the database. After the loading action is detected at block 102, and the location of the work vehicle is determined at block 104, the controller may compare the location of the work vehicle to the sets of parameters to determine which geofence, if any, corresponds to the location of the work vehicle. The work vehicle may be located within the threshold ranges of more than one geofence. In some embodiments, the controller may automatically select the closest geofence, or the controller may allow the operator to select (e.g., via a prompt of the user interface) a desired geofence. Then, the controller may determine that the determined product type is the respective product type associated with the geofence that corresponds to the location of the work vehicle. In some embodiments, the model may also include a density associated with the product type. The controller may determine the density of the product of the determined type by referencing the model.

In some embodiments, the model may be generated based on a satellite or aerial image upon which the geofences are graphically overlain. For example, a drone may capture the aerial image of the industrial job site. The supervisory control system or the controller may process the aerial image using computer vision (e.g., edge detection) to determine object boundaries of piles of product in the image. The object boundaries of the aerial image may be converted to geofences based on the location of the drone and/or location references in the aerial image. Additionally or alternatively, a user may manually draw or trace the boundaries of the piles in the aerial image to establish the geofences. Furthermore, in certain embodiments, the user may enter shape parameters defining the geofences, such as coordinate points representing vertices of a polygon, a center point and a radius representing a circle, or any other suitable parameters which define a shape. Each of the detected object boundaries, drawn boundaries, shape parameters, or data relating thereto may be stored in the model in association with respective geofence identifiers. The model may further include product types associated with the respective geofences.

At block 110, after the determined product type is determined, the controller may output an indication to the operator via the user interface. The indication may indicate the determined product type and prompt the operator to confirm or reject the determined product type. For example, the controller may display, via the display, the name of the determined product type (e.g., gravel) and an identifying image associated therewith. The user interface may also present a first selectable option to confirm the determined product type and a second selectable option to reject the determined product type. In some embodiments, only one of the first and second selectable options may be presented, such that the unpresented option is presumptively chosen if the presented option is not selected within a threshold period of time. For example, the user interface may present a selectable option to reject the determined product type, such that a lack of selection within the threshold period of time is treated as confirmation of the determined product type. In certain embodiments, block 110 may be omitted, and the selection may be completely automatic.

At block 112, the controller may receive a user input (e.g., a first user input) indicative of the operator confirming or rejecting that the determined product type is the current product type. For example, the operator may determine and submit, based on knowledge of the products, that the determined product type matches or contradicts the current product type. In some embodiments, confirmation of the determined product type may be used to reinforce a confidence metric of the model.

At block 114, the controller may generate a data entry for the load. The data entry may include, among other information, the product type and a quantity (e.g., weight, volume) of the load. The data entry may be part of a set of data entries, which may be used to bill customers and/or monitor inventory. In some embodiments, the data entry may include a density of the product based on the model or based on stored characteristics of the product. Additionally, the controller may determine a volume of the load based on the weight and the density. The controller may also determine a fill metric based on the weight. For example, the fill metric may be proportional to the weight and inversely proportional to the density. Additionally, the fill metric may be based on a ratio of the volume of the load and a capacity of the loading implement (e.g., the bucket). Multiple data entries may be aggregated and presented and/or individually presented in a data report (e.g., a bill, a receipt, an invoice, a performance report, an activity log, or the like). The data report may list multiple data entries or portions thereof along with a total amount and/or a total cost of multiple loads. The data report may include other reporting information, such as a company name, a timestamp, a customer name, a work vehicle identifier, or a combination thereof. In some embodiments, each data entry and/or the data report may be presented to the operator (e.g., upon request) via the user interface.

Referring back to block 106, the controller may determine that the location of the work vehicle is not within any of the geofences and not within (e.g., less than or equal to) a threshold distance (e.g., zero meters, 1 meter, 5 meters, 10 meters) from any of the geofences. In response, the controller may request and/or receive, via the user interface, a user input (e.g., a second user input) indicative of the current product type. For example, the operator may manually select or submit the current product type based on knowledge of the products. In some embodiments, the user interface may present a list of possible product types from which the operator may select the current product type. In this way, the operator may provide the current product type when the model is unable to determine a determined product type due to the work vehicle being in a non-geofenced location/more than a threshold distance away from a geofenced location. After the current product type is provided by the operator, the controller may proceed to block 118.

At block 118, the model may be updated in response to receiving the user input indicative of the current product type. In response to determining, at block 106, that the work vehicle is not within a geofence, the controller may update the model by adjusting one or more geofences, generating one or more new geofences, re-associating product types to geofences, or a combination thereof. In some embodiments, the controller may compare the current product type with the determined product type associated with the geofence in which the work vehicle is not located (e.g., the closest geofence). In response to determining that the current product type matches the determined product type, the controller may modify the geofence to include the location of the work vehicle, such that the modified geofence corresponds to the current product type provided by the operator. In some embodiments, the controller may modify the geofence depending on whether the geofence is within an additional threshold distance of the work vehicle. In this way, the controller may not modify a geofence far from the work vehicle to include the location of the work vehicle. In some embodiments, the controller may perform the comparison of the current product type and the determined product type for every geofence in the model.

By way of example, the work vehicle may perform a loading action at coordinates (x, y) located outside of a geofence/more than a threshold distance from a geofence of a gravel pile. The controller may output an indication to the user interface, requesting that the operator provide the current product type. The operator may submit that the current product type is gravel. In response to determining that the determined product type of the geofence is gravel, the controller may modify one or more parameters (e.g., boundary coordinates, radius, etc.) or boundaries of the geofence of the gravel pile, such that the geofence is updated to encompass the coordinates (x, y). After the model is updated, the controller may proceed to block 114 and generate the data entry, as described above, using the current product type as the product type.

Alternatively, the controller may determine that the current product type does not match the determined product type. Then, the controller may modify the model to include (e.g., generate) an additional geofence (e.g., a second geofence) associated with the current product type, such that the additional geofence is associated with the current product type and includes the location of the work vehicle. Whether or not the current product type matches the determined product type, at block 118, the controller may update the model such that the updated model associates the location of the work vehicle with a geofence associated with the current product type.

Referring back to block 112, the operator may reject the determined product type. In response, the controller may request and/or receive, via the user interface, a user input (e.g., the second user input or a third user input) indicative of the current product type. For example, the operator may manually select or submit the current product type based on knowledge of the products. In some embodiments, the user interface may present a list of possible product types, from which the operator may select the current product type. In this way, the operator may provide the current product type when the determined product type is not accurately determined. Then, with the corrected product type, the controller may proceed to block 118.

At block 118, the model may be updated in response to receiving the user input indicative of the current product type. For example, the user input may indicate that the model contains the wrong determined product type for the geofence in which the work vehicle is located. Then, the controller may update the determined product type to be the current product type. In another situation, the location of the work vehicle may be associated with the wrong geofence in the model, causing the controller to incorrectly determine the determined product type. For example, the determined product type may disagree with the current product type if the model incorrectly associates the location of the work vehicle with the wrong geofence. The controller may modify the model in accordance with the current product type in view of the location of the work vehicle. The controller may adjust a first geofence associated with the determined product type to exclude the location of the work vehicle. Additionally, the controller may adjust a second geofence associated with the current product type to include the location of the work vehicle, or the controller may generate a second geofence associated with the current product type that includes the location of the work vehicle. In this way, the model may associate the location of the work vehicle with the current product type and dissociate the location of the work vehicle from the determined product type, which was inaccurately determined. After the model is updated, the controller may proceed to block 114 and generate the data entry, as described above, using the current product type as the product type.

In certain embodiments, some steps of the method 100 may be omitted. For example, blocks 106, 110, 112, 116, and 118 may be omitted, such that the controller does not receive or act upon feedback from the operator. Instead, the controller may proceed with accepting the determined product type without confirmation from the operator. Rather than present the determined product type to the operator, the controller may automatically populate the data entry using the determined product type. In some embodiments, instances of loading actions in certain locations may be recorded for later analysis. For example, the determined product types may be determined and the data entries may be generated after multiple loading actions have occurred (e.g., after a job is completed).

Keeping the foregoing in mind, another way to update the model in response to changing piles may involve visually analyzing the piles to detect changes. In some embodiments, the camera of the control system may generate image data of the surroundings, which may include one or more piles. By analyzing the image data in relation to the position (i.e., location and orientation) of the work vehicle, the controller may determine one or more object boundaries of the one or more piles in the image data. The object boundaries, like the geofences, may indicate sizes, shapes, and locations of the piles. The controller may compare the object boundaries to the geofences to determine any discrepancies and update the geofences to match the object boundaries, in response to detection of discrepancy/discrepancies.

Figure 4:
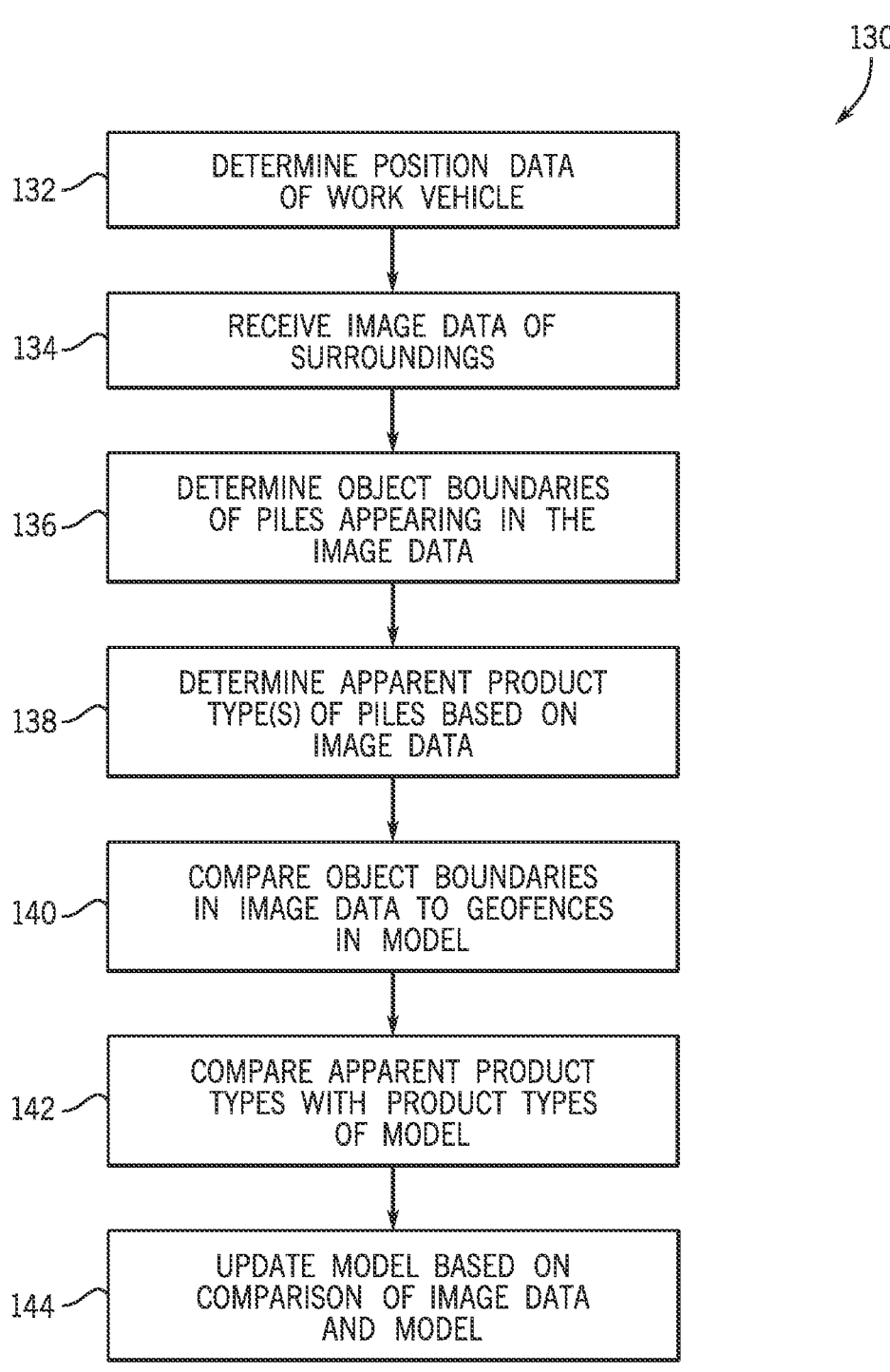
FIG. 4 is a flowchart of an embodiment of a method for updating a model of geofences and product types based on image data in accordance with an aspect of the present disclosure.

Referring now to FIG. 4, FIG. 4 is a flowchart of an embodiment of a method 130 for updating the model based on image data, in accordance with an embodiment of the present disclosure. Although the method 130 is described below as performed by the controller, the method 130 or portions thereof may be performed by any suitable computing device and/or processor, such as the supervisory control system. Moreover, although the following description of the method 130 includes steps performed in a particular order, the steps of the method 130 may be performed in any suitable order.

At block 132, the controller may determine the location and facing direction (e.g., position data) of the work vehicle using the position sensor (e.g., GPS) and, in certain embodiments, an orientation sensor (e.g., a compass). The location and facing direction may be integrated with the image data to enable the controller to determine how the object boundaries of the pile(s) in the image data correspond to the position and shape of the pile(s) in physical or modeled space.

At block 134, the controller may receive the image data of the surroundings of the work vehicle, in which the surroundings include one or more piles. In some embodiments, the camera may be coupled to the work vehicle and configured to output the image data to the controller. Alternatively, the camera may be coupled to a different vehicle, such as a drone. In certain embodiments, multiple cameras may be positioned throughout the industrial job site (e.g., on fixed platform(s), on one or more work vehicles, on one or more drones, etc.) to monitor the industrial job site. The image data may include photographs captured at certain intervals (e.g., every 10 seconds). Additionally or alternatively, the camera may capture the photographs in response to certain event(s), such as the work vehicle entering a geofence and/or performing a loading action. In some embodiments, the image data may include video data. The video data may be associated with the location and facing direction and/or a timestamp.

At block 136, the controller may determine object boundaries of one or more piles in the image data. For example, the controller may identify geometric properties (e.g., shape(s) and size(s)) of the pile(s) based on appearance in the image data. In some embodiments, the controller may analyze the image data using various image processing techniques, including boundary detection, edge detection, and the like. In this way, the controller may determine object boundaries of the pile(s) to determine geometric properties (e.g., shape, size, and orientation) of the pile(s). Further, using the location and facing direction, the controller may establish a geospatial reference for the geometric properties. For example, the controller may determine that the work vehicle is located at coordinates (x, y) and facing in a direction (Z). Based on the geometric properties, in conjunction with the geospatial reference, the controller may relate the object boundaries of the image data to virtual or physical pile(s). For example, the location and facing direction may provide spatial context to determine boundaries of the pile(s) in space based on boundaries of the pile(s) in the image data.

At block 138, the controller may determine apparent product type(s) of the pile(s) based on the image data. That is, the controller may employ various image processing techniques (e.g., computer vision) to identify the apparent product type(s). For example, the controller may compare the image data to additional image data in an image database. The image database may include candidate product types, each associated with one or more reference images against which the image data may be compared. In some embodiments, the controller may employ an image recognition model to identify the apparent product type(s). The image recognition model may be a machine learning model (e.g., random forest classifier, neural network, etc.) trained on a set of training images to classify the image data as having the apparent product type(s).

In some embodiments, blocks 132, 134, 136, and 138 may be performed to generate the model if the model does not already exist. That is, instead of comparing the image data to an existing model, the image data may be used to create a new model. For example, the work vehicle may perform a sweep of the industrial job site to gather the image data and create the model. Subsequently, the model may be applied to generate determined product types, as described above.

At block 140, the controller may compare the pile(s) as the pile(s) appear in the image data to the pile(s) as the pile(s) are represented by respective geofence(s) in the model. For example, the geofence(s) may indicate represented properties (e.g., size, shape, location) of the pile(s), and the processed image data, including the object boundaries and the location and facing direction data, may indicate monitored properties of the pile(s). The controller may compare the represented properties and the monitored properties to determine any contradictions therebetween. If the appearance of the pile(s) in the image data differ from the geofences by a sufficient amount (e.g., more than a threshold change in one or more geometric properties), then the controller may recognize that the model is inaccurate.

At block 142, the controller may compare the apparent product type(s) of the pile(s) as determined based on the image data to the product types of the same pile(s) in the model to determine any contradictions. For example, the controller may first determine the product type(s) of the pile(s) based on the model. Then, the controller may determine whether the apparent product type(s) and the product type(s) from the model are the same. If so, then the controller may determine that the model is accurate in regard to the product type(s), and a confidence metric of the model may be improved (e.g., increased). Steps involved with image type identification (e.g., blocks 138 and 142) may be omitted in certain embodiments.

At block 144, the controller may update the model based on the comparison between the piles as represented in the image data and the piles as represented in the model. For example, the controller may adjust one or more of the geofences to correspond to the product shape(s), size(s), and location(s) of the pile(s) as determined based on the object boundaries, the location, and the facing direction. The controller may update the geofence in the model in response to determining that the object boundaries differ from the geofences in the model by more than a threshold variation. Additionally, in response to determining that the apparent product type(s) and the product type(s) of the model differ, the controller may update the model to associate the geofence(s) with apparent product type(s). In some embodiments, the image data may be recorded over a period of time and associated with the location and facing direction data for later processing. For example, blocks 132 and 134 may be performed over a period of time prior to the image processing and modeling steps of blocks 136, 138, 140, 142, 144. For example, the position and image data may be recorded over a period of time (e.g., a data collection period) as the work vehicle drives throughout the industrial job site. Then, the position and image data may be analyzed as a batch, whereupon the model may be updated after the data is collected.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A product identification system, comprising:
a controller comprising one or more processors and a memory, wherein the controller is configured to:
identify a loading action performed by a work vehicle;
determine whether the work vehicle is located within a threshold distance of a geofence;
in response to determining that the work vehicle is located within the threshold distance of the geofence, determine a determined product type associated with the loading action based on a model, wherein the model associates the geofence with the determined product type, the model comprises a plurality of geofences mapped to a plurality of product types, the plurality of geofences comprises the geofence, and the plurality of product types comprises the determined product type; and
in response to determining that the work vehicle is not located within the threshold distance of the geofence:
determine a current product type associated with the loading action;
determine whether the current product type matches the determined product type associated with the geofence in the model;
in response to determining that the current product type matches the determined product type, update the geofence to include a location of the work vehicle; and
in response to determining that the current product type does not match the determined product type, modify the model to include a second geofence associated with the current product type, wherein the second geofence includes the location of the work vehicle.

2. The product identification system of claim 1, wherein the controller is configured to update the geofence to include the location of the work vehicle in response to further determining that the work vehicle is located within an additional threshold distance of the geofence.

3. The product identification system of claim 1, wherein determining the current product type comprises receiving a user input indicative of the current product type.

4. The product identification system of claim 3, wherein the controller is configured to control a user interface to present a request for the user input, wherein the request comprises a set of selectable options indicative of a plurality of candidate product types.

5. The product identification system of claim 1, wherein determining the current product type comprises receiving image data of surroundings of the work vehicle.

6. The product identification system of claim 1, wherein the controller is configured to determine a weight of material within a bucket of the work vehicle.

7. A controller comprising one or more processors configured to:
identify a loading action of a material load performed by a work vehicle;
determine a location of the work vehicle;
determine whether the work vehicle is located within a geofence; and
in response to determining that the work vehicle is located within the geofence:
determine a determined product type associated with the material load based on a model, wherein the determined product type corresponds to the geofence in the model, the model comprises a plurality of geofences mapped to a plurality of product types, the plurality of geofences comprises the geofence, and the plurality of product types comprises the determined product type;
receive, via a user interface, a first user input confirming or rejecting the determined product type; and
in response to receiving the first user input rejecting the determined product type:
modify the geofence to exclude the location of the work vehicle;
receive a second user input indicative of a current product type; and
modify a second geofence to include the location of the work vehicle or update the model to include the second geofence having the location of the work vehicle, wherein the second geofence corresponds to the current product type.

8. The controller of claim 7, wherein the controller is configured to control a user interface to present a request for the second user input, wherein the request comprises a set of selectable options indicative of a plurality of candidate product types.

9. The controller of claim 7, wherein the controller is configured to, in response to receiving the first user input confirming the determined product type, generate a data entry comprising the determined product type and a quantity value associated with the material load.

10. The controller of claim 9, wherein the controller is configured to determine a fill metric based on the quantity value and a material density associated with the determined product type.

11. The controller of claim 9, wherein the quantity value is a weight measured via a weight sensor of the work vehicle.

12. A product identification system comprising:
a controller comprising one or more processors and a memory, wherein the controller is configured to:
determine position data of a work vehicle;
receive image data of surroundings of the work vehicle;
identify one or more piles of material in the image data;
determine one or more object boundaries of the one or more piles of material in the image data;
compare the one or more object boundaries with one or more geofences stored in a database; and
update the one or more geofences based on the one or more object boundaries.

13. The product identification system of claim 12, wherein the database associates the one or more geofences with one or more respective product types.

14. The product identification system of claim 13, wherein the controller configured to:
determine one or more apparent product types corresponding to the one or more piles of material based on the image data;
determine one or more determined product types corresponding to the one or more piles of material based on the database;
compare the one or more apparent product types with the one or more determined product types; and
update the database in response to determining that the one or more apparent product types do not match the one or more determined product types.

15. The product identification system of claim 13, wherein the controller is configured to:
identify a loading action performed by the work vehicle; and
determine a determined product type associated with the loading action, wherein the determined product type corresponds to a geofence of the one or more geofences, wherein the work vehicle is located within the geofence.

* * * * *